Patented Aug. 14, 1951

2,564,405

UNITED STATES PATENT OFFICE 2,564,405

PROCESS FOR THE PURIFICATION OF 4-METHYLPENTADIENE-1,3

Rupert C. Morris, Berkeley, Calif., and Alva V. Snider, Hempstead, N. Y., assignors to Shell Development Company, San Francisco, Calif., a corporation of Delaware No Drawing. Application April 17, 1948, Serial No. 21,744

7 Claims. (Cl. 260—681.5)

This invention relates to a process for the separation of dienes. More particularly the invention relates to a process for the separation of 4-methylpentadiene-1,3 from its isomer, 2-methylpentadiene-1,3.

More specifically the invention provides a practical and highly economical method for the separation of substantially pure 4-methylpentadiene-1,3 from a mixture comprising or consisting of 4-methylpentadiene-1,3 and its isomer, 2-methylpentadiene-1,3 which comprises treating the mixture containing the two dienes with an alpha,beta-unsaturated aldehyde at a temperature below about 150° C. so as to effect a preferential combination of the 2-methylpentadiene-1,3 isomer, with the said alpha,beta-unsaturated aldehyde, and subsequently separating from the resulting reaction mixture the unreacted 4-methylpentadiene-1,3 in substantially pure form. The novel process is characterized by the fact that it may be accomplished in a much shorter period of time, in a far simpler manner of operation, and may be made to produce much higher yields and greater purity of product than any of the presently known methods for the separation of these compounds.

This application is a continuation-in-part of our application No. 562,052, filed November 4, 1944 and now abandoned.

Many important uses for 4-methylpentadiene-1,3 have been now discovered in industry. Full exploitation of these uses has been hampered, however, because of the difficulty and expense involved in obtaining the compound in the state of purity desired for most of its intended applications. This difficulty arises from the fact that many sources of supply of 4-methylpentadiene-1,3 contain considerable amounts of the isomer 2-methylpentadiene-1,3 and the separation of these two methylpentadienes has proved to be a difficult problem. Due to the close similarity between the physical properties of these two isomers physical methods, such as distillation, extraction and the like, are of little use in effecting the desired separation. The most satisfactory method available, heretofore, for the separation of the 4-methylpentadiene-1,3 from the 2-methylpentadiene-1,3 has been to treat the mixture containing the two isomers with maleic anhydride at a low temperature in the presence of a solvent such as dioxane and a polymerization inhibitor. Under these conditions the 2-methyl derivative reacts with the maleic anhydride to form an addition product and the 4-methyl derivative remains relatively inactive to be later removed by distillation. This method of separation, however, has several important economical drawbacks. In order to prevent the 4-methyl derivative from undergoing polymerization with the maleic anhydride it is essential that the temperature of the reaction mixture be maintained at a very low level, e. g., about 0° C. The use of this low temperature range requires the separation process to be stretched out over a very long period of time. In addition, even under the stated conditions, some polymerization of the 2-methyl and 4-methyl derivatives take place with a resulting reduction in the yield of the 4-methyl derivative and an eventual contamination of the separation equipment by the accumulated polymer.

It is, therefore, an object of the invention to provide a practical and highly economical method for the separation of substantially pure 4-methylpentadiene-1,3 from a mixture comprising or consisting of 4-methyl-pentadiene-1,3 and its isomer, 2-methylpentadiene-1,3. It is a further object of the invention to provide a method for the separation of 4-methyl-pentadiene-1,3 from 2-methylpentadiene-1,3 which may be accomplished in a relatively short reaction period. It is a further object to provide a method for the separation of 4-methylpentadiene-1,3 from 2-methylpentadiene-1,3 which results in much higher yields and greater purity of product than has been possible heretofore by the known methods. It is a further object to provide a method for the separation of 4-methylpentadiene-1,3 from 2-methyl-pentadiene-1,3 which may be operated more efficiently than the prior known methods. It is a further object of the invention to provide a practical and highly economical method for the separation of dienes having a structural arrangement similar to that present in 4-methylpentadiene from dienes having a structural arrangement similar to that present in 2-methylpentadiene-1,3. Other objects will be apparent from the detailed description given hereinafter.

It has now been discovered that these and other objects may be accomplished by the novel process of the invention which comprises treating the mixture containing the 4-methylpentadiene-1,3 and 2-methylpentadiene-1,3 with an alpha,beta-unsaturated aldehyde at a temperature below about 150° C. so as to effect a preferential combination of the 2-methylpentadiene-1,3 and subsequently separating from the resulting mixture the unreacted 4-methylpentadiene-1,3 in substantially pure form.

The discovery that this method could be utilized to effect a substantially complete separation of the 4-methylpentadiene-1,3 and 2-methylpentadiene-1,3 was entirely unexpected in view of the teaching of the art. It would be expected, for example, in view of the close similarity between many of the reactions of maleic anhydride and the alpha,beta-unsaturated aldehydes that the unsaturated aldehyde would undergo the same type of reaction when introduced into the diene mixture, i. e. the unsaturated aldehyde would polymerize with the 2-methyl derivative and the 4-methyl derivative.

It was found, on the contrary, however, that when the alpha,beta-unsaturated aldehydes are added to the diene mixture no polymerization takes place but the unsaturated aldehyde combines preferentially with the 2-methyl derivative to form an addition product. It would also be expected in view of the teaching in the art of the reaction between isoprene and piperylene and some unsaturated aldehydes that there would also be a reaction between the 4-methylpentadiene and the aldehydes. It was found, on the contrary, however, that no such reaction takes place under the conditions of the process of the invention.

The alpha,beta-unsaturated aldehydes which may be utilized in the process of the invention may be described, in general, as having the following general formula:

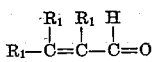

wherein each $R_1$ is the same or different substituent selected from the group comprising the hydrogen atom, hydrocarbon radicals and substituted hydrocarbon radicals.

The hydrocarbon radicals which $R_1$ may represent in the above-described general formula for the unsaturated aldehydes may be the saturated aliphatic radicals, such as methyl, ethyl, butyl, tert-butyl, isopentyl, heptyl, and the like; the saturated cyclo-aliphatic radicals, such as cyclobutyl, cyclopentyl and cyclohexyl; and the aromatic radicals, such as phenyl, tolyl, and the like.

The substituted hydrocarbon radicals which $R_1$ may represent in the above-described formula are the same as those hydrocarbon radicals described above for the $R_1$ wherein at least one of the hydrogen atoms on the hydrocarbon radicals has been replaced by a non-interfering substituent group, such as, for example, a halogen atom, an alkoxy group, and the like. The substituted hydrocarbon radicals may be exemplified by such radicals as 2-chlorobutyl, 3-acetylpentyl, 2-bromocyclohexyl, 3-acetoxy-4-heptyl, 2-acetyl-5-hydroxyoctyl, and the like.

Examples of the alpha,beta-unsaturated aldehydes which may be utilized in the process of the invention are 2-propenal, 2,4-dimethyl-2-butenal, 2-methyl-2-propenal, 3-isopropyl-2-propenal, 2-butyl-2-butenal, 3-tert-butyl-2-butenal, 2-chloroethyl-2-pentenal, 2-acetoxypropyl-2-octenal, 2-isobutyl-2-hexenal, 2,6-dipropyl-2-hexenal, 2-isopentyl-2-decenal, 2,6-diethyl-2-octenal, and 2-isohexyl-2-heptenal.

The more preferred unsaturated aldehydes to be utilized in the process of the invention, however, are the alpha-alkyl substituted alpha,beta-unsaturated aldehydes, i. e., those compounds of the above-described general formula wherein the $R_1$ on the alpha carbon atom is an alkyl radical containing from 1 to 5 carbon atoms, such as methyl, ethyl, tert-butyl, and the like, and the $R_1$'s on the beta carbon atom are members of the group comprising the hydrogen atom and alkyl radicals containing from 1 to 8 carbon atoms, such as methyl, ethyl, pentyl, hexyl, and octyl.

Examples of the preferred alpha,beta-unsaturated aldehydes to be utilized in the process of the invention are 2-methyl-2-propenal (methacrolein), 2-ethyl-2-propenal, 2-isopropyl-2-propenal, 2-tert-butyl-2-butenal, 2-ethyl-2-pentenal, 2-ethyl-2-pentenal, 2-butyl-2-hexenal, 2-ethyl-butenal, 2-pentyl-2-octenal, 2-isobutyl-2-heptenal, and the like.

The alpha,beta-unsaturated aldehyde to be utilized in the process of the invention may be composed of just one of the above-described unsaturated aldehydes or may be made up of two or more different unsaturated aldehydes.

Any hydrocarbon mixture containing the 4-methylpentadiene-1,3 and 2-methylpentadiene-1,3 may be utilized in the process of the invention as the source of the dienes. Preferred mixtures to be utilized as the source of the dienes are those mixtures obtained from the dehydration of 2-methyl-2,4-pentanediol and diacetone glycols. These mixtures usually contain larger amounts of the 2-methyl derivatives than the 4-methyl derivatives, e. g. 60% to 80% 2-methyl derivatives and 20% to 25% 4-methyl derivatives.

As described hereinabove the process of the invention comprises treating the mixture containing the 4-methylpentadiene-1,3 and 2-methyl-pentadiene-1,3 with an alpha,beta-unsaturated aldehyde at a temperature below 150° C. so as to effect a preferential combination of the 2-methyl-pentadiene-1,3 isomer with the unsaturated aldehyde and subsequently separating from the resulting mixture the unreacted 4-methylpentadiene-1,3 in substantially pure form. While the reactants in this process may be employed in any desired molecular ratio it is desirable, in order to bring about a more complete removal of the 2-methyl derivative, to regulate the relative amounts of the reactants so as to furnish at least about 1 equivalent of the alpha,beta-unsaturated aldehyde for each equivalent of 2-methylpentadiene-1,3. It is preferred to utilize from about 1.0 to about 1.5 equivalents of the unsaturated aldehyde for each equivalent of the 2-methylpentadiene-1,3.

The reaction mixture comprising the dienes and the unsaturated aldehydes is then heated at a temperature below about 150° C. A satisfactory reaction rate is usually obtained at temperatures between 70° C. to 130° C. and these are the more preferred temperatures to be used in the process. Temperatures much above 150° C., e. g., about 175° C. should not be used as these bring about undesirable reactions in the mixture.

The process may be carried out at atmospheric, sub-atmospheric, or super-atmospheric pressures. In a majority of cases, the alpha,beta-unsaturated aldehyde combines quite readily with the 2-methyl derivative and elevated pressures are not required. However, in some cases it may be desirable to employ super-atmospheric pressures. Pressures of up to about 100 pounds per square inch are usually sufficient. It is usually preferred to utilize pressures of the order of about 100 p. s. i. to about 200 p. s. i.

In certain cases, as where the reactants are of viscous nature, it may be desirable to add a diluent to the reaction mixture. The diluent, if employed, may be utilized in any suitable amount, as, for example, one part by volume of diluent for each part by volume of reactant.

Suitable diluent materials are, in general, the hydrocarbon solvents, such as benzene, the xylenes, and the like. Mixtures of solvents may also be utilized if desired.

When the reaction of the unsaturated aldehyde with the 2-methyl derivative is complete the reaction mixture may then be subjected to some suitable means to remove the unreacted 4-methylpentadiene-1,3. The separation of the 4-methyl derivative may be accomplished by such means as extraction, distillation, and the like, but is preferably recovered by subjecting the reaction mixture to fractional distillation under reduced or atmospheric pressure.

Any appropriate type of apparatus may be utilized for the process. It is usually preferred to carry out the reaction in pressure equipment having means for supplying heat or cooling to the reaction chamber and for securing reasonably accurate temperature control. The process may be conducted in a batchwise, semi-continuous manner. The process is particularly adapted for a continuous operation and that manner of conduction is particularly preferred.

To illustrate how the process of the invention may be utilized to effect the desired separation of the 4-methylpentadiene-1,3 from 2-methylpentadiene-1,3 the following examples are given. It is to be understood, however, that these examples are given for the purpose of illustration only and should not be considered as limiting the invention in any way.

Example I

A technical mixture comprising about 80% 2-methylpentadiene-1,3 and about 20% 4-methylpentadiene-1,3 was reacted with acrolein in an amount such as to furnish about 1.25 equivalents of acrolein for each equivalent of 2-methylpentadiene-1,3. The reaction was carried out by refluxing the reaction mixture at atmospheric pressure for about 78 hours. At the end of this time the reaction mixture was distilled thereby separating the pure 4-methylpentadiene-1,3. This product had a refractive index ($n$-20/D) 1.4529), the refractive index of pure 2-methylpentadiene-1,3 being 1.4479 while that of 4-methylpentadiene-1,3 is 1.4534.

Example II

A mixture of 4-methylpentadiene-1,3 and 2-methylpentadiene-1,3 was reacted with methacrolein by refluxing at atmospheric pressure for about 30 hours substantially as described in Example VII. Distillation of the reaction product resulting in the isolation of pure 4-methylpentadiene-1,3.

Example III

Crotonaldehyde was reacted with a technical mixture of 4-methylpentadiene-1,3 and 2-methylpentadiene-1,3 at a temperature of from 79° C. to 97° C. for 164 hours at atmospheric pressure. A good yield of pure 4-methylpentadiene-1,3 was obtained by distilling the reaction mixture.

In another experiment crotonaldehyde was reacted with the aforesaid technical mixture of methylpentadiene at a pressure of 140 to 170 pounds per square inch. In this case the reaction time was reduced to 17 hours and a good yield of substantially pure 4-methylpentadiene-1,3 was isolated from the reaction mixture.

Example IV 2-methyl-3-ethylacrolein was contacted with a mixture of 2-methylpentadiene-1,3 and 4-methylpentadiene-1,3 at a temperature of 115° C. to 120° C. and a pressure of about 150 pounds per square inch. After a reaction time of about 72 hours the product was distilled. This resulted in the separation of pure 4-methylpentadiene which was uncontaminated by 2-methylpentadiene-1,3.

Example V

Pure 4-methylpentadiene-1,3 was also prepared from a mixture of 2-methylpentadiene-1,3 with 4-methylpentadiene-1,3 by contacting the said technical mixture with 2-ethyl-3-propylacrolein. The reaction mixture was distilled after a reaction period of 17 hours thereby separating substantially the theoretical amount of 4-methylpentadiene-1,3.

We claim as our invention:

1. A process for the separation of 4-methylpentadiene-1,3 from a mixture comprising 4-methylpentadiene-1,3 and 2-methylpentadiene-1,3 which comprises reacting the said mixture with a compound of the formula:

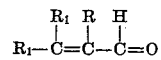

wherein R is an alkyl radical containing from 1 to 5 carbon atoms and each $R_1$ is a member of the group consisting of hydrogen and alkyl radicals containing from 1 to 8 carbon atoms at a temperature below about 150° C., and subsequently separating the unreacted 4-methylpentadiene-1,3 from the resulting reaction mixture.

2. A process for the separation of 4-methylpentadiene-1,3 from a mixture comprising 4-methylpentadiene-1,3 and 2-methylpentadiene-1,3 which comprises reacting the said mixture with an alpha,beta-unsaturated aldehyde at a temperature below about 150° C., and subsequently separating out the unreacted 4-methylpentadiene-1,3.

3. A process for the separation of pure 4-methylpentadiene-1,3 from a mixture comprising 4-methylpentadiene-1,3 and 2-methylpentadiene-1,3 which comprises contacting the said mixture with an amount of acrolein which is at least equivalent to the amount of 2-methylpentadiene-1,3 at a temperature between about 70° C. and about 130° C. and a pressure of up to about 200 pounds per square inch, and distilling the reaction mixture to separate the pure 4-methylpentadiene-1,3 therefrom.

4. A process for the separation of pure 4-methylpentadiene-1,3 from a mixture comprising 4-methylpentadiene-1,3 and 2-methylpentadiene-1,3 which comprises contacting the said mixture with an alpha hydrocarbon substituted alpha,-beta-unsaturated aldehyde at a temperature below 150° C., and subsequently separating the unreacted 4-methylpentadiene-1,3 from the reaction mixture.

5. A method for the separation of pure 4-methylpentadiene-1,3 from a technical mixture comprising 4-methylpentadiene-1,3 and 2-methylpentadiene-1,3 which comprises reacting the said mixture with methacrolein at a temperature below 150° C., and separating from the resulting reaction mixture the unreacted 4-methylpentadiene-1,3 in substantially pure form.

6. A process for the separation of pure 4-methylpentadiene-1,3 from a mixture comprising 4-methylpentadiene-1,3 and 2-methylpentadiene-1,3 which comprises reacting the said mixture with an amount of 2-methyl-3-ethylacrolein which is at least equivalent to the amount of 2-methylpentadiene-1,3 at a temperature below 150° C., and subsequently separating the unreacted 4-methylpentadiene-1,3 from the resulting reaction mixture in substantially pure form.

7. A process for the separation of 4-methylpentadiene-1,3 from a mixture comprising 4-methylpentadiene-1,3 and 2-methylpentadiene-1,3 which comprises contacting the said mixture with an amount of 2-ethyl-3-propylacrolein which is at least equivalent to the amount of 2-methylpentadiene-1,3 at a temperature below 150° C., and subsequently separating the unreacted 4-methylpentadiene-1,3 from the resulting reaction mixture in substantially pure form.

RUPERT C. MORRIS.
ALVA V. SNIDER.

REFERENCES CITED

The following references are of record in the file of this patent:

UNITED STATES PATENTS

| Number | Name | Date |
|---|---|---|
| 1,944,732 | Diels et al. | Jan. 23, 1934 |
| 2,375,023 | Morris et al. | May 1, 1945 |

FOREIGN PATENTS

| Number | Country | Date |
|---|---|---|
| 309,911 | Great Britain | July 11, 1930 |

OTHER REFERENCES

Bachman et al. Jour. Am. Chem. Soc., vol. 64, 787–790 (1942).

Bachman et al. Jour. Am. Chem. Soc., vol. 66, 1513–14 (1944).